Patented Feb. 9, 1937

2,069,823

UNITED STATES PATENT OFFICE 2,069,823

WATERPROOFING MATERIALS AND PROCESSES FOR PRODUCING THE SAME

William M. Driesen, Clifton, N. J.

No Drawing. Application March 26, 1932,
Serial No. 601,452

4 Claims. (Cl. 134—26)

My invention relates to materials suitable for waterproofing and refers particularly to substances adapted for the waterproofing of fibers, fabrics, paper, concrete and other materials where waterproof conditions are desired.

Among the objects of my invention are waterproofing materials having low melting points, very low acidity, flexibility and low viscosity in order that they may be readily applied in a molten condition to both flexible and inflexible substances, producing flexible results upon fibers, fabrics, paper, leather and other substance having natural flexibility.

The low melting points of my materials, or substances, allow them to be applied without injurious heating of the treated product, their low viscosity produces increased uniformity of treatment and penetration and their freedom from solvents overcomes the expense incident to the recovery of the solvent and the injurious effect of the fumes upon the operators.

I have found that if resins, and I will later define the products included in that designation, and soaps be fused, or melted, together and the product treated with a calcium compound, there is produced a substance, or mixture, with a lower melting point, a lower viscosity and a greater flexibility than has the resin itself or the substance resulting from the reaction between the resin and the soap.

I have found that the above substances have valuable waterproofing properties and that when applied in a molten state to a flexible material, there results a waterproof flexible material possessing a high gloss.

My process is adaptable for employment with saponifiable resins, among which may be mentioned saponifiable natural resins, ester gums, glycerine and phthalic acid condensation products.

Among the soaps included in the process of my invention are the water-soluble soaps, among which are the sodium, potassium, borate, ammonium salts of oleic, stearic, palmetic, abietic, ricinoleic, linoleic, butyric, caproic and capric acids.

By calcium compounds, I mean those compounds of calcium which are disassociated during my process, among which are calcium hydrate, calcium carbonate and calcium acetate.

In order to obtain desired degrees of hardness, flexibility, elasticity, toughness and other physical properties, other chemicals can be added to those already mentioned, among which may be mentioned waxes and wax-like substances, as animal waxes, vegetable waxes, mineral waxes, paraffin, japan wax, cocoa butter, stearic acid, spermacetic oil, wool oil, shellac, beeswax, carnauba wax, chinese wax, ceresin, including esters of mono- and diatomic alcohols of the aliphatic and aromatic fatty acids.

Metallic compounds other than the calcium compounds may also be employed in my process to produce desired physical properties in the final result, among which are salts of magnesium, lead and iron.

I give the following as examples of the process of my invention:

Example 1

2000 grams of ester gum are fused slowly and when fusion is complete, 200 grams of olive oil soap are added and allowed to remain upon the surface until its water is driven off by the heat of the resin and foaming has largely subsided. The soap is then thoroughly incorporated into the bath with stirring. 70 grams of hydrated lime are slowly added. Heat is continued until the melt becomes quiet and foaming subsides and the temperature is then raised above the melting point. It is then allowed to cool and may be broken up into pieces or may be ground into powder. As an example of the use of this composition of matter for treating paper, I give the following:—the composition of matter is melted at a temperature of about 275° F., a glassine paper is passed therethrough and drawn through two heated scrapers at about the same temperature and then passed through two heated rolls having about the same temperature. After having passed through the last mentioned rolls the paper is run through two chill rolls which are water-cooled to a temperature of about 60° F. and then the ordinary processes of paper treatment are followed.

Example 2

In this example the same quantities of chemicals and the same steps of procedure are followed as in Example 1, except that the addition of the hydrated lime is followed by adding 10 grams magnesium carbonate, 10 grams lead acetate, 10 grams ferrous carbonate and 30 grams hydrated lime.

Example 3

This following of my process is the same as Example 1 except that 50 grams ceresin wax are added.

Example 4

This example is the same as Example 2 except that 100 grams beeswax are added.

Example 5

Same as Example 3 except that the ester resin is substituted by an equal quantity of amber.

Example 6

Same as Example 3 except that the ester gum is substituted by an equal quantity of chlorinated diphenyl.

Example 7

Same as Example 3 except that the ester gum is substituted by an equal quantity of chlorinated naphthalene.

Example 8

In this example the hydrated lime is replaced by an equal molecular weight of calcium carbonate, the magnesium carbonate is replaced by an equal molecular weight of magnesium sulphate, and the ferrous carbonate is replaced by an equal molecular weight of ferrous sulphate, as in the process of this example it is necessary to employ water-soluble compounds. In this method the soap is dissolved in water and solutions of the salts named are added in their respective order to the boiling soap solution and the precipitated soaps thus formed permitted to coagulate. If for some reason complete coagulation does not appear to take place, it may be assisted by the addition of a 10% alum solution. The separated metallic soaps thus produced are strained from the solution and washed free of glyceride and dried. These dried or semi-dried soaps are added slowly to the fused resins and heat applied to drive off any occluded moisture. The lime addition is made in similar fashion to that described. The finishing temperature of the fused batch should be about 180° C.

The above mentioned, and other ingredients included in my invention, may be added in various combinations and proportions to produce a final product of desired physical properties, and hence, I do not limit myself to the particular chemicals, quantities, times, temperatures or steps of procedure specifically mentioned as these are given simply as a means for clearly describing my invention.

What I claim is:—

1. In a process for the production of a waterproofing composition of matter in solid form, the steps which consist in heating a mixture of ester gum and a water-soluble soap to a uniform mass, adding a calcium compound, heating the mixture, and allowing it to cool.

2. In a process for the production of a waterproofing composition of matter in solid form, the steps which consist in heating a mixture of ester gum, a wax, and a water-soluble soap to a uniform mass, adding a calcium compound, heating the mixture, and allowing it to cool.

3. A composition of matter formed according to claim 1 possessing waterproofing properties and having a lower melting point, lower viscosity, and greater flexibility than either the ester gum or the substance formed by melting the ester gum with the soap employed.

4. A composition of matter formed according to claim 2 possessing waterproofing properties and having a lower melting point, lower viscosity, and greater flexibility than either the ester gum or the substance formed by melting the ester gum with the soap employed.

WILLIAM M. DRIESEN.